United States Patent [19]

Nutter, Jr.

[11] Patent Number: 4,648,921
[45] Date of Patent: Mar. 10, 1987

[54] METHOD OF MAKING FIBER REINFORCED ARTICLES

[75] Inventor: Harry A. Nutter, Jr., Longmeadow, Mass.

[73] Assignee: United Technologies Corporation, Hartford, Conn.

[21] Appl. No.: 448,167

[22] Filed: Dec. 10, 1982

Related U.S. Application Data

[63] Continuation of Ser. No. 193,519, Oct. 2, 1980, abandoned.

[51] Int. Cl.[4] ............ B29C 43/04; B29C 43/18
[52] U.S. Cl. ..................... 156/77; 156/78; 156/79; 156/242; 29/156.8 B; 29/156.8 P; 416/226; 416/229 R; 416/230
[58] Field of Search ............ 156/77, 78, 79, 242, 156/245; 416/226, 229 R, 230 A; 29/156.8 B, 156.8 P

[56] References Cited

U.S. PATENT DOCUMENTS 3,647,317 3/1972 Furlong et al. .............. 416/226
3,666,589 5/1972 Alderfer .......................... 156/245

Primary Examiner—Caleb Weston
Attorney, Agent, or Firm—John Swiatocha

[57] ABSTRACT

An improved method is disclosed for forming articles, especially airfoils, comprised of a fiber reinforced plastic bonded to a metal object. In the manufacture of a propeller blade a subassembly is made by coating a metal spar with a certain class of adhesive to a depth of 5–40 mils to compensate for dimensional variations in the spar surface, transferably coating the interior of a subassembly mold with the adhesive, then inserting the coated spar into the mold and injecting a lightweight filler material. The adhesive and filler are then precured and the subassembly removed from the mold. A fibrous reinforcing material, such as glass fiber cloth, is then used to cover or wrap the subassembly, the subassembly thus covered is placed in a second mold and a synthetic polymeric material such as epoxy resin, previously or subsequently applied, is then cured. In the formation of other articles, the filler material might be entirely omitted, and the reinforcing fibers would be separated from a metal substrate only by the precured adhesive.

11 Claims, 9 Drawing Figures

FIG. 8
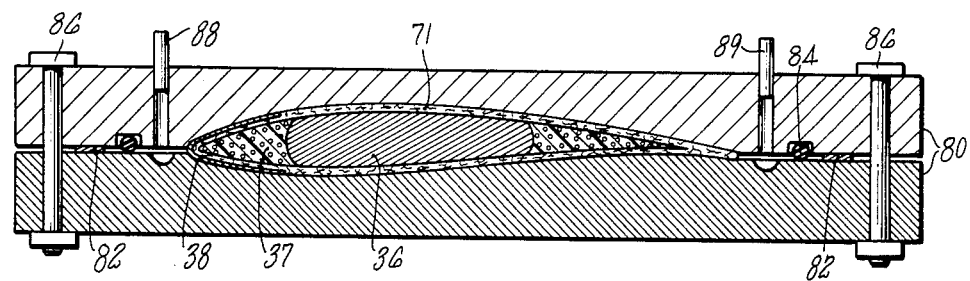
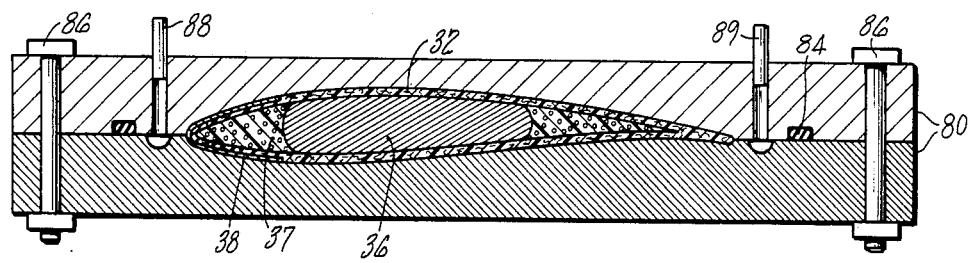
FIG. 9

METHOD OF MAKING FIBER REINFORCED ARTICLES

This is a continuation of application Ser. No. 193,519, filed Oct. 2, 1980, now abandoned.

TECHNICAL FIELD

This invention relates to a method for making articles and more specifically relates to a method for making articles having a fiber reinforced plastic bonded to metal. The invention relates more specifically, though not exclusively, to an improved method for manufacturing an airfoil.

BACKGROUND ART

A variety of methods exist for forming or fabricating various structures from fiber reinforced plastic (FRP). Articles of FRP may exhibit cost advantages over similar articles manufactured entirely of metal because of a reduced number of pieces required, which may result in reduced labor. The production of an article with fewer parts is due to the wide latitude of complex part configurations permissible with FRP molding. However, on structures incorporating metal parts, secondary bonding operations are necessary for high strength bonds between the FRP and metal and generally restrict molding or laminating directly on the metal part. Although primers have been developed for coating the metal, the resulting bond with a laminating resin is generally not adequate for certain types of structural bonds.

For instance, U.S. Pat. No. 3,321,019 issued May 23, 1967 to G. A. Dimitroff et al for Fiberglass Blade, owned by the assignee of the present application, discloses the formation of a reinforced fiberglass blade for use in helicopters, which blade includes a particular reinforced plastic blade root construction. More specifically, that blade root construction comprises alternate layers of aluminum reinforcing plates and plastic impregnated fiberglass cloth. A suitable primer is provided between each metal plate and layer of fiberglass cloth to prevent metal oxidation and to improve the adhesion between the metal plates and the plastic impregnated fiberglass cloth. Such primers typically take the form of coatings having a thickness less than 1 or 2 mils. The alternate metal and fiberglass sheet laminations are arranged over a spar member and are then adhesively bonded to one another by a vacuum injection process in which liquid plastic impregnates the fiberglass cloth and fills a mold. The resulting structure provides sufficient strength and integrity for its intended function, that being the resistance of shear stresses imposed by bolts which couple the helicopter blade to a central hub. However, the bond between the alternate metal plate and fiberglass laminations may not provide the desired degree of strength and integrity for other applications.

For example, fixed wing aircraft have employed FRP propeller blades for nearly 20 years. These blades have generally comprised a pre-molded FRP shell securely bonded to a central metal spar, with certain spaces between the shell and spar completely filled with a foamtype material. Adequate structural integrity between the fiberglass shell and the metal spar were obtained using certain adhesives, as for instance a thermosetting, non-volatile, modified epoxy resin such as AF111 manufactured by Minnesota Mining & Manufacturing Company which was placed as a film on the spar prior to the bonding of the fiberglass shell therewith. Such adhesives provide a bonding strength which far exceeds that possible by the primers utilized in the aforementioned U.S. Pat. No. 3,321,019 and are thus able to provide the spar-to-shell bond for structures of this particular type and utilization. It will be appreciated, however, that this long standing practice, first required the formation of a molded FRP shell and then required the secondary bonding operation through which the shell and spar were integrally joined.

Accordingly, it is a principal object of the present invention to provide an improved method for manufacturing various fiber-reinforced airfoils, such as propeller blades. Included in this object is the reduction of manufacturing labor while retaining or improving the structural characteristics and dimensional uniformity or repeatability of the product.

DISCLOSURE OF INVENTION

In accordance with the present invention, there is provided an improved method for forming articles comprised of a fiber reinforced plastic bonded to a metal object. The surface of the metal object is coated with an adhesive, and particularly a thermosetting, nonvolatile, modified epoxy liquid adhesive with enhanced bonding properties following precuring. The adhesive thickness may vary from 5 to 40 mils as required to compensate for dimensional variations in the metal and can be formed to shape in a mold. The adhesive is precured and one or more layers of reinforcing fibers such as fiberglass cloth, are applied to the adhesively coated surface of the metal object. The fibers are previously or subsequently impregnated with a liquid plastic. Preferably, the fiber-covered object is placed in a mold and a liquid plastic such as a synthetic polymeric material, as for instance a thermosetting resin, is introduced to the mold to thereby impregnate the fiber layer on the object. Following impregnation of the fiber layer, the polymerizable material is cured within the mold to form the article in accordance with the shape of the mold. The in-situ molding of the fiberglass with the adhesive-coated metal object creates a strong bond therebetween and results in a substantial reduction in the labor which otherwise would have been required for a secondary bonding operation.

In a preferred embodiment of the invention, the method is utlized in the manufacture of airfoils such as propeller blades. A blade subassembly may first be made by coating a metal spar with the requisite adhesive, partly to compensate for dimensional variations, then transferably coating the interior of a subassembly mold with the adhesive, then placing the spar within the mold, partially precuring the adhesives, introducing a foaming material thereinto and finally precuring the foam and adhesives such that the foam is bonded to certain portions of the spar for jointly forming the blade subassembly. The blade subassembly is subsequently enveloped with reinforcing fibers, as for instance fiberglass cloth, and placed in a final mold into which a liquid plastic such as a thermosetting resin is injected and cured to thereby complete the formation of the blade. The resin-impregnated fiberglass is bonded, via the adhesive, to the foam at some locations and to the metal spar at other locations. A protective metal sheath also having the precured adhesive on its inner surface may be placed on the outer surface of the fiberglass prior to resin impregnation and will be included as an integral part of the resulting blade.

BRIEF DESCRIPTION OF DRAWINGS

FIG. 8 is a diagrammatic sectional view of the final mold showing the blade assembly of FIG. 7 therein during the first phase of final molding; and FIG. 9 is a view similar to that of FIG. 8 but illustrating the mold in a secondary phase of the final molding operation.

BEST MODE FOR CARRYING OUT THE INVENTION

Figure 1:
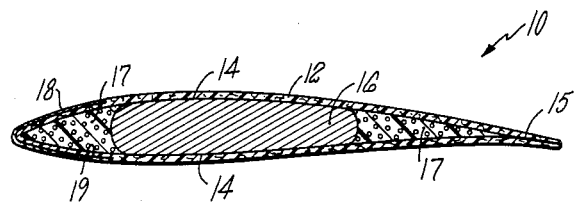
FIG. 1 is a transverse sectional view of a propeller blade made in accordance with a prior art process.

Referring to FIG. 1, there is illustrated in transverse section, an airfoil, such as propeller blade 10 manufactured in accordance with the prior art. Propeller blade 10 includes an outer shell 12 of fiber reinforced plastic, which shell is bonded, via a bonding adhesive 14, to an aluminum spar 16 extending substantially centrally therewithin and attaining airfoil accuracy no better than the cumulative tolerances of the spar, shell and bond thickness. A lightweight filler material such as a rigid urethane foam 17 is formed within the voids remaining between shell 12 and adjacent to spar 16 following their bonding to one another. A protective metal sheath 18 is subsequently fitted and bonded to the leading edge of blade 10 by means of an adhesive bond 19.

The FRP shell 12 was molded by vacuum bag molding on a male shell mold or mandrel which fiberglass was impregnated with a thermosetting resin which was subsequently cured. The shell 12 is generally formed as a single structure having sufficient slotting along its forward or leading edge to facilitate the introduction of spar 16. The trailing edge is usually slotted the entire length and is subsequently joined by the adhesive bond 15, following insertion thereinto of the spar 16 having the adhesive 14 thereon in the form of a film. The adhesive 14 is then cured under heat and pressure to provide the desired bond. A tie-coat mixture to epoxy resin, polyamide hardener and toluene is used to coat the surfaces which define the voids between shell 12 and spar 16 to enhance retention of the foam 17 which is subsequently formed in those voids, as by pouring liquid foam in and heat curing. Significant time is then still required to prepare the blade and sheath 18 for bonding, complete that bond, and "finish" the blade.

Figure 2:
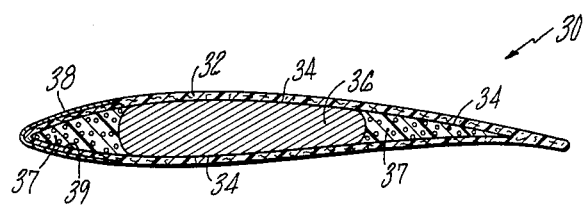
FIG. 2 is a transverse sectional view of a propeller blade made in accordance with the process of the present invention.

In contrast with the relatively complex prior art process for manufacturing blade 10, the blade 30 of FIG. 2 is made in accordance with the in-situ molding process of the present invention and thereby substantially reduces the labor involved. Blade 30 is structurally similar to prior art blade 10 and includes an outer fiber-reinforced plastic shell 32 bonded to an aluminum spar 36 via a layer of particular bonding adhesive 34 in mutual bonding contact therewith. Moreover, the voids between the FRP shell 32 and spar 36, forwardly and rearwardly of the spar, are filled with lightweight filler material such as rigid urethane foam 37. A protective nickel sheath 38 is also bonded via a suitable adhesive 39 to portion of the leading edge of the FRP shell 32. However, the process of the invention considerably simplifies the manufacture of blade 30 relative to prior art blade 10 while also affording certain improvements in the attainment and repeatability of dimensional tolerances from blade to blade.

Figure 3:
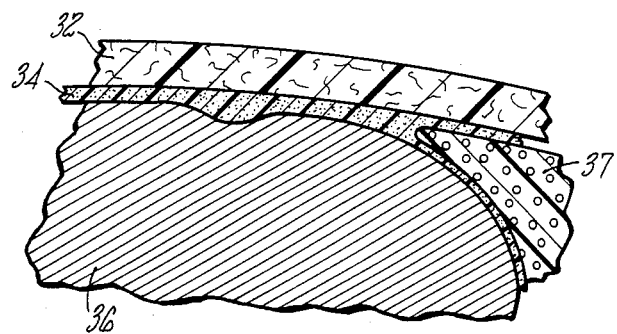
FIG. 3 is an enlarged view of a portion of the blade illustrated in FIG. 2.

FIG. 3 illustrates in greater detail the bonded relationship of the fiber-reinforced plastic 32 with the aluminum spar 36 via adhesive 34. The selection of the adhesive 34 used to practice the method of the invention is relatively important and in the preferred embodiment comprises a thermosetting, non-volatile, modified epoxy liquid adhesive, and particularly that sold by Minnesota Mining & Manufacturing Company under the trade name EC-2214 R. This adhesive and those of the same modified epoxy class, when precured, provide a particularly strong bond between the metal substrate 36 and the resin of the FRP 32. This adhesive 34 facilitates the in-situ molding method in which the adhesive 34 is first applied to the metal substrate 36 and is precured and the reinforcing fiber, as for instance fiberglass cloth, is laid up on the adhesively coated surface of the substrate and is impregnated with a liquid plastic, as for instance a thermosetting epoxy resin, which is subsequently cured while contained within a mold having the desired shape of the article.

Figure 4:
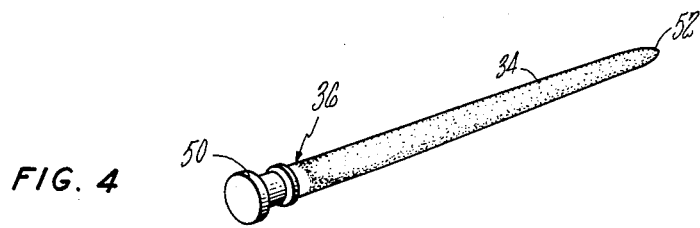
FIG. 4 is a perspective view of an adhesive-coated blade spar.

Referring in greater detail to the specific process for making the airfoil or propeller blade 30, attention is called to FIGS. 4-9 which sequentially illustrate various aspects of the blade manufacturing process. FIG. 4 illustrates a conventional elongated aluminum spar 36 having a root portion 50 and a tip portion 52. Spar 36 provides the principal strength member for blade 30. Spar 36 is coated over substantially its entire surface, except for root portion 50, with the adhesive 34. The adhesive 34 is conveniently thinned with methyl ethyl ketone and is initially spray-deposited on the spar to a thickness of about 3-5 mils, following which it is cured at a temperature of about 250° F. for about 45 minutes, then wiped with methyl-ethyl ketone and sandblasted to abrade the surface. An additional coating of adhesive 34 is sprayed thereover to an additional thickness of about 10-12 mils. Finally the adhesive 34 may be applied in a paste form to the adhesive already on the top and bottom surfaces of the spar 36 such that it "sizes" the spar to fill any unevenness and bring the final dimension to one which will at least continuously contact the upper and lower inner surfaces of a first mold. The thickness of adhesive 34 on these upper and lower surfaces of spar 36 is generally in the range of about 5 mils to 40 mils or more.

Figure 5:
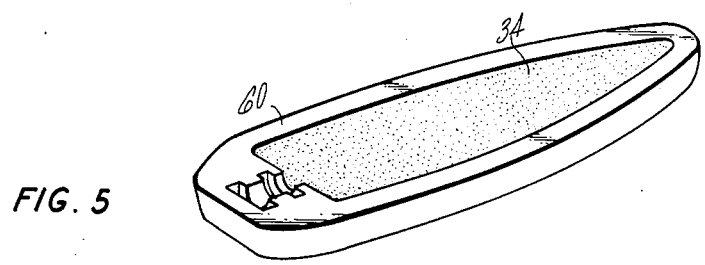
FIG. 5 is a perspective view of one-half of an adhesive-coated mold for making a blade subassembly.
Figure 6:
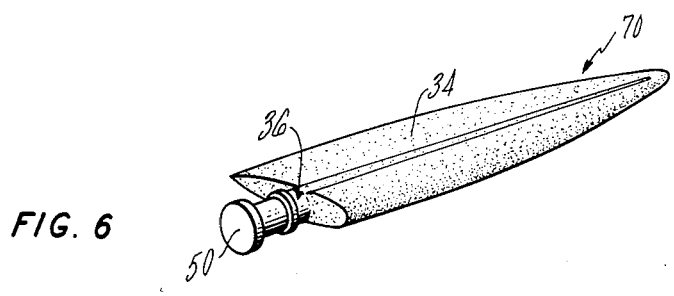
FIG. 6 is a perspective view of a blade subassembly.

The opposing halves of a blade subassembly mold are similarly coated with 10-12 mils of adhesive 34, one-half of such mold being illustrated as element 60 in FIG. 5. A conventional transfer or release agent, such as Kanstik LM followed by a coat of Arcon 5003, is first applied to the cavities of mold halves 60. The adhesive 34, thinned as previously mentioned with methyl ethyl ketone, is spray-deposited upon the release agent within the mold over substantially the total blade area excepting the root portion 50.

The adhesively-coated spar 36 of FIG. 4 is positioned in the adhesive-coated mold halves 60 which are then closed about the spar. A partial curing of the adhesive 34 is then obtained by heating to 210° F. for about 30 minutes. The mold cavities of the blade subassembly mold 60 contact the adhesive 34 on the upper and lower surfaces of spar 36, but are substantially wider than the spar in the fore and aft directions of the blade such that voids are created thereat for the formation therein of the foam segments 37. After purging the mold with nitrogen, a two component, semi-prepolymer rigid urethane foam 37 is mixed in the proper proportion and is then introduced to the closed mold 60, as by injection at its bottom, to fill the voids not occupied by spar 36. The foam 37 and the adhesive 34 on spar 36 and transferably on the mold 60 are then finally cured, as by heating to a temperature of 250° F. for 45-60 minutes. The mold 60 is then cooled, following which the spar/foam blade subassembly 70 illustrated in FIG. 6 may be removed therefrom.

The blade subassembly 70 is only slightly smaller than the final blade 30 and includes the adhesive 34, now precured, extending over substantially its entire outer surface, except for root portion 50, the adhesive on the foam portion 37 having been transferred thereto from the interior of mold 60 and the adhesive on the upper and lower surfaces (relative to FIG. 2) of spar 36 having been applied directly thereon. This precured coating of adhesive 34 is typically at least 5 to 10 mils and may be 40 mils or more in thickness to fill and smooth any irregularities such as scratches and gouges which may have been in the surface of spar 36, thereby to provide blade subassembly 70 with a surface of relatively high quality and accuracy. In this way, the adhesive 34 performs a sizing function to assure a repeatable size of the subassembly 70. Moreover, this coating of adhesive 34 protects the spar 36 and foam 37, to some degree, from damage due to handling in the subsequent stages of the manufacturing process.

The precured coating of adhesive 34 may then be cleaned by wiping with methyl-ethyl ketone and sandblasted to prepare it for subsequent bonding. The root portion 50 of subassembly 70 may then be mounted in a suitable fixture, not shown, for the application or laying-up of the reinforcing fiber to be used.

Figure 7:
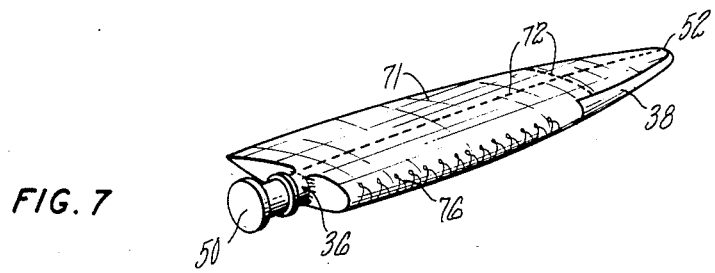
FIG. 7 is a perspective view of a blade subassembly with fiber reinforcement prior to final molding.

Referring to FIG. 7, the blade subassembly is illustrated as having been covered or enveloped with one or more layers of the reinforcing fiber. In the present instance, 4-7 layers of woven fiberglass cloth 71, as for instance Style 1581 available from the United Merchants Company, have been very tightly wound about the blade subassembly at the proper cloth warp-to-blade axis angle, i.e., 35°, and stitched, as at 72, to retain it in position thereon. The fiberglass cloth 71 envelopes the entirety of the foam 37 and extends inwardly thereof toward root portion 50 and into engagement with the adhesive 34 thereat on spar 36 for totally enclosing the foam. It will be appreciated that other high strength reinforcing fibers such as aramid, graphite, boron or the like may be substituted for the fiberglass 71. The protective nickel sheath 38 may then be pressed onto the leading edge of the fiberglass-covered subassembly near the outer tip 52 where it is temporarily held in position by its somewhat resilient engagement with the fiberglass bulk extending thereinto. The fiberglass-engaging surface of sheath 38 will have been previously dip coated with an adhesive 39 which is substantially the same as adhesive 34 and which will have been precured in substantially the same manner as for adhesive 34. Optional heater wires 76 may be placed against the leading edge of the wrapped fiberglass 71 toward the root end 50 of the blade subassembly and may be temporarily retained thereat by attaching with cotton thread.

Referring to FIG. 8, the fiberglass-covered blade subassembly of FIG. 7 is then placed in the cavity formed by the opposing halves of a final mold 80 to which a suitable mold release agent(s) has been previously applied. In the primary phase of this final mold operation, the opposing halves of mold 80 are moved from a fully open position to a partly open position and retained thereat in a slightly spaced relationship, as by two or more spacers 82 which may be about 0.020 inch thick. A compressible O-ring 84 positioned between the halves of mold 80 serves to sealingly enclose the mold cavity in a known manner when the halves of the mold are drawn against the spacers 82, as by suitable clamps 86. A vacuum source (not shown) is applied to vacuum port 88 and the desired liquid plastic is then introduced to the mold cavity via inlet 89. The liquid plastic is preferably a synthetic polymerizable material, as for instance a thermosetting epoxy resin such as APCO 434 marketed by Applied Plastics Company.

It is normally difficult to obtain the high glass-to-resin ratio which is required for various airfoils including propeller blades and the like, particularly where the number of layers of fiberglass is increased. However, by providing spacers 82 in accordance with the present process, complete wet-out of all layers of the fiberglass 71 can be quickly and easily accomplished even with higher viscosity resins that are not otherwise normally used.

Referring to FIG. 9, when the injection of resin has been completed, the mold spacers 82 are removed and the mold 80 is fully closed. The excess resin is forced out of the mold cavity through the vacuum and inlet ports 88 and 89 respectively. In this phase of the final molding operation in which the mold 80 is fully closed, the mold cavity very precisely and durably defines the geometry to be given the resulting blade 30. To polymerize and thereby cure the resin, it is heated within mold 80 to a temperature of about 250° F. for approximately 45-60 minutes. This curing of the resin about the fiberglass results in the fiber reinforced shell 32 forming a particularly strong bond with the precured adhesive 34 and thus with the spar 36. A similar bond is obtained between the shell 32 and the foam 37 through the agency of the adhesive 34 in that retion. Additionally, the sheath 38 becomes strongly bonded to the shell 32 through the agency of the adhesive 39 thereat. The mold 80 is cooled and the blade 30 is then removed in a substantially completed form. Generally, only a very small amount of flashing remains about its midline and is easily removed.

Although this invention has been shown and described with respect to a preferred embodiment thereof, it should be understood by those skilled in the art that various changes and omissions in the form and detail thereof may be made therein without departing from the spirit and scope of the invention. For instance, it will be appreciated that the impregnation of the reinforcing fibers with liquid plastic may be accomplished by means other than injection into the mold. For example, the glass fiber cloth may be preimpregnated with epoxy resin and partially cured prior to its placement on the substrate or subassembly, or the resin may be applied by brush to the glass fiber cloth while on the subassembly and subsequently cured in the mold. These techniques may not, however, realize some of the manufacturing economies realized by the preferred process.

I claim:

1. A method for manufacturing an airfoil, comprising the steps of:
   coating the external surface of a spar with a curable bonding adhesive;
   transferably coating the interior surface of a first mold with a curable bonding adhesive;
   disposing said coated spar in said mold, said mold interior surface being spaced from at least a portion of said coated spar to define a void region;
   introducing a curable lightweight filler material into said mold void region;
   precuring said curable bonding adhesives and lightweight filler material within said mold thereby to form an airfoil subassembly having the filler material adhesively bonded to the spar and including an adhesive coating on the outer surface thereof;
   enveloping substantially the entire airfoil subassembly within a covering of fibrous reinforcing material impregnated with a synthetic polymeric material and constrained within a second mold to a desired shape; and
   curing said synthetic polymeric material which impregnates said reinforcing material covering within said second mold to thereby produce an airfoil of said desired shape.

2. The method of claim 1 wherein said step of enveloping said subassembly in said covering of reinforcing material impregnated with said polymeric material and constrained within said second mold comprises:
   enveloping substantially the entire airfoil subassembly within a covering of said reinforcing material applied thereto to a desired thickness;
   subsequently disposing the reinforcing material-covered airfoil subassembly in said second mold; and
   subsequently introducing said polymeric material to said second mold to thereby impregnate said reinforcing material covering on said airfoil subassembly.

3. The method of claim 2 wherein said second mold comprises a pair of mold halves movable between open and closed positions and defining when closed a mold cavity conforming exactly to the desired airfoil and wherein said steps of disposing said reinforcing material-covered airfoil subassembly in said second mold and of introducing said polymeric material thereto include maintaining said second mold in a spaced, partly open position while compressibly sealing the mold cavity having the reinforcing material-covered airfoil subassembly therewithin, introducing a sufficient amount of said synthetic polymeric material to fill the mold cavity while said second mold is partly open, and subsequently moving said mold halves to said closed position for said curing of said polymeric material.

4. The method of claim 1 wherein said spar is metal, said external surface of said spar and said interior surface of said mold are coated with the same adhesive, said adhesive being a thermosetting, non-volatile, modified epoxy liquid, said filler material is a rigid urethane foam, said fiberous reinforcing material comprises glass fibers, and said synthetic polymeric material is a thermosetting epoxy resin.

5. The method of claim 1 wherein two substantially oppositely facing portions of the external surface of the spar are each spaced from the interior surface of the first mold at least about 5 mils and the coating of adhesive on said spar at said spar surface portions is to a thickness at least sufficient to contact the interior surface of said first mold thereat.

6. The method of claim 5 wherein the steps of coating the external surface of the spar and the internal surface of the first mold with an adhesive comprises applying said adhesive coatings to respective thicknesses of at least about 5 mils over the spar and at least about 10 mils on the interior surface of said mold whereby said adhesive coating on the outer surface of said airfoil subassembly following said precuring is at least about 5 mils thick.

7. The method of claim 6 wherein said step of coating said spar with adhesive comprises the steps of applying said adhesive as an inner coating, said inner coating being about 3 to 5 mils thick, curing said first adhesive coating, and applying said adhesive to said inner coating as an outer coating, said outer coating being at least 10 mils thick.

8. The method of claim 1 wherein said adhesive coatings on the external surface of said spar and the interior surface of said first mold are of the same adhesive, said adhesive being a thermosetting, nonvolatile, modified epoxy liquid adhesive.

9. The method of claim 8 wherein said adhesive is spray deposited to form said coatings.

10. The method of claim 4 wherein said glass fiber reinforcing material comprises multiple layers of glass fiber cloth.

11. The method of claim 4 wherein said spar includes a root end and a tip end, said foam is coextensive with most of said spar excepting said root end, and said glass fiber material comprises glass fiber cloth, said cloth enveloping the entirety of said foam and extending beyond said foam in the direction of the root end of said spar and being in contact with the adhesive coating on said spar near said root end whereby to sealingly isolate said foam from the environment.

* * * * *